United States Patent
Hsieh

(10) Patent No.: US 8,695,432 B2
(45) Date of Patent: Apr. 15, 2014

(54) SCREW WITH STRESS SENSING DEVICE

(75) Inventor: Chih-Ching Hsieh, Taichung (TW)

(73) Assignee: Kabo Tool Company, Taichung (TW)

( * ) Notice: Subject to any disclaimer, the term of this patent is extended or adjusted under 35 U.S.C. 154(b) by 208 days.

(21) Appl. No.: 13/346,741

(22) Filed: Jan. 10, 2012

(65) Prior Publication Data

US 2012/0185002 A1    Jul. 19, 2012

(30) Foreign Application Priority Data

Jan. 19, 2011   (TW) .............................. 100101984 A

(51) Int. Cl.
*F16B 31/02* (2006.01)
*F16B 35/00* (2006.01)
*A61B 17/84* (2006.01)

(52) U.S. Cl.
USPC .............. 73/761; 411/383; 606/300; 606/301

(58) Field of Classification Search
USPC .................... 73/761; 411/8, 13–14, 383–384; 606/102, 300–301, 304, 315–316, 323, 606/328
See application file for complete search history.

(56) References Cited

U.S. PATENT DOCUMENTS

| | | | | |
|---|---|---|---|---|
| 4,127,788 A | * | 11/1978 | Daugherty | .................... 310/328 |
| 4,466,296 A | * | 8/1984 | Keyes, IV | .................. 73/862.52 |
| 4,553,124 A | * | 11/1985 | Malicki | ............................. 338/5 |

\* cited by examiner

*Primary Examiner* — Nicholas Woodall
*Assistant Examiner* — Larry E Waggle, Jr.
(74) *Attorney, Agent, or Firm* — CKC & Partners Co., Ltd.

(57) ABSTRACT

A screw with a stress sensing device is disclosed. The screw includes a main body, a coaxial member and a stress sensing member. The main body has a hollow threaded hole along its axle center, and the coaxial member is applied to be screw into the threaded hole. The coaxial member includes an elongated body and two threaded parts disposed on both ends of the elongated body. The two threaded parts are applied to engage with and screwed in the threaded hole, and thus the stress applied on the main body can also be applied on the elongated body. One of the two threaded parts has a groove. The stress sensing member is arranged on the elongated body, and the signal sensed by the stress sensing member can be obtained via a wire passing through the groove.

4 Claims, 3 Drawing Sheets

SCREW WITH STRESS SENSING DEVICE

RELATED APPLICATIONS

The application claims priority to Taiwan Application Serial Number 100101984, filed Jan. 19, 2011, which is herein incorporated by reference.

BACKGROUND

1. Field of Invention

The present invention relates to a screw. More particularly, the present invention relates to a screw with a stress sensing device.

2. Description of Related Art

A screw is a commonly used tool for combining two parts together, such that the two parts cannot be detached. The section of screw is very important in the precision technology field. For example, a screw is often required to connect two shell plates of an aircraft or a train, and at this point, how to select proper screws to withstand the stress is a big test to the designer's ability. However, even if the original design has been tested with no errors, it still cannot be guaranteed that a subsequent use is still safe after objective conditions (such as mechanical aging, rust, metal fatigue, etc.).

SUMMARY

Therefore, an aspect of the present invention is directed to providing a screw with a stress sensing device. The screw with the stress sensing device includes a screw main body, a coaxial member and a stress sensing member. There is a hollow threaded hole in an axle center of the screw main body, and the coaxial member is engaged with and screwed in the hollow threaded hole, wherein the coaxial member is coaxial with the screw main body. The coaxial member includes an elongated body and two threaded parts, wherein the two threaded parts which are disposed on both ends of the elongated body are engaged with and screwed in the hollow threaded hole to withstand a stress applied on the screw main body; wherein one of the two threaded parts has a groove. The stress sensing member disposed on the elongated body can transmit a stress signal by a wire passing through the groove.

In addition, according to other embodiments of the present invention, the screw with the stress sensing device further includes a positioning base formed from a concave surface of the elongated body for loading the stress sensing member. Furthermore, a top surface of the threaded part with the groove is concaved to form a hexagonal driver groove, and the depth of the hexagonal driver groove does not exceed one half of the thickness of the threaded part at which the hexagonal driver groove is located. Moreover, the screw main body has a screw head and a screw body, wherein an inner edge of the threaded part with the groove is aligned with a bottom end of the screw head, and an outer edge of the threaded part with no groove is aligned with a bottom end of the screw body.

According to the aforementioned embodiments of the present invention, the screw with the stress sensing device can effectively sense and monitor a variety of stress conditions when two parts are connected by the screws.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
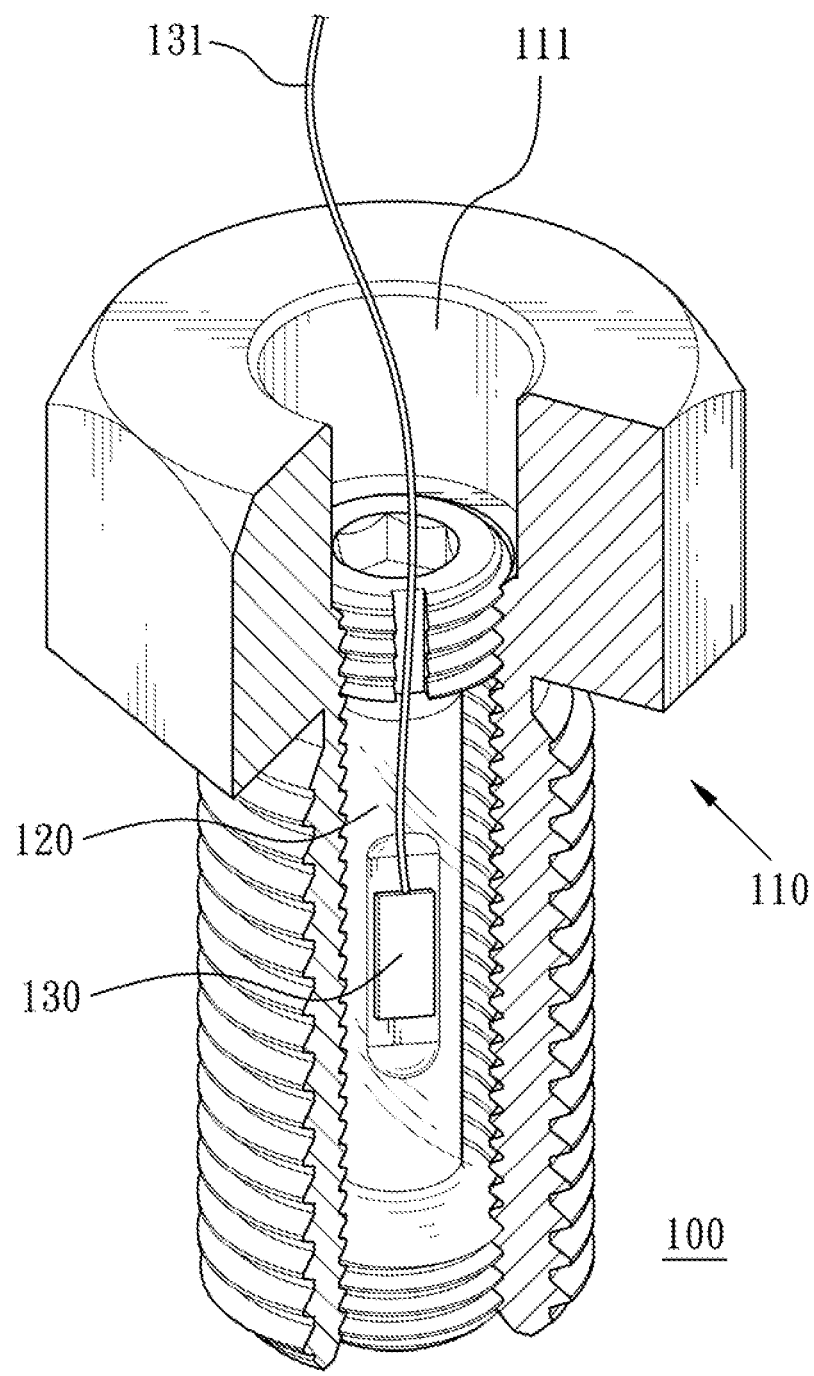
FIG. 1 is a structural schematic three-dimensional view of a screw 100 with a stress sensing device according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
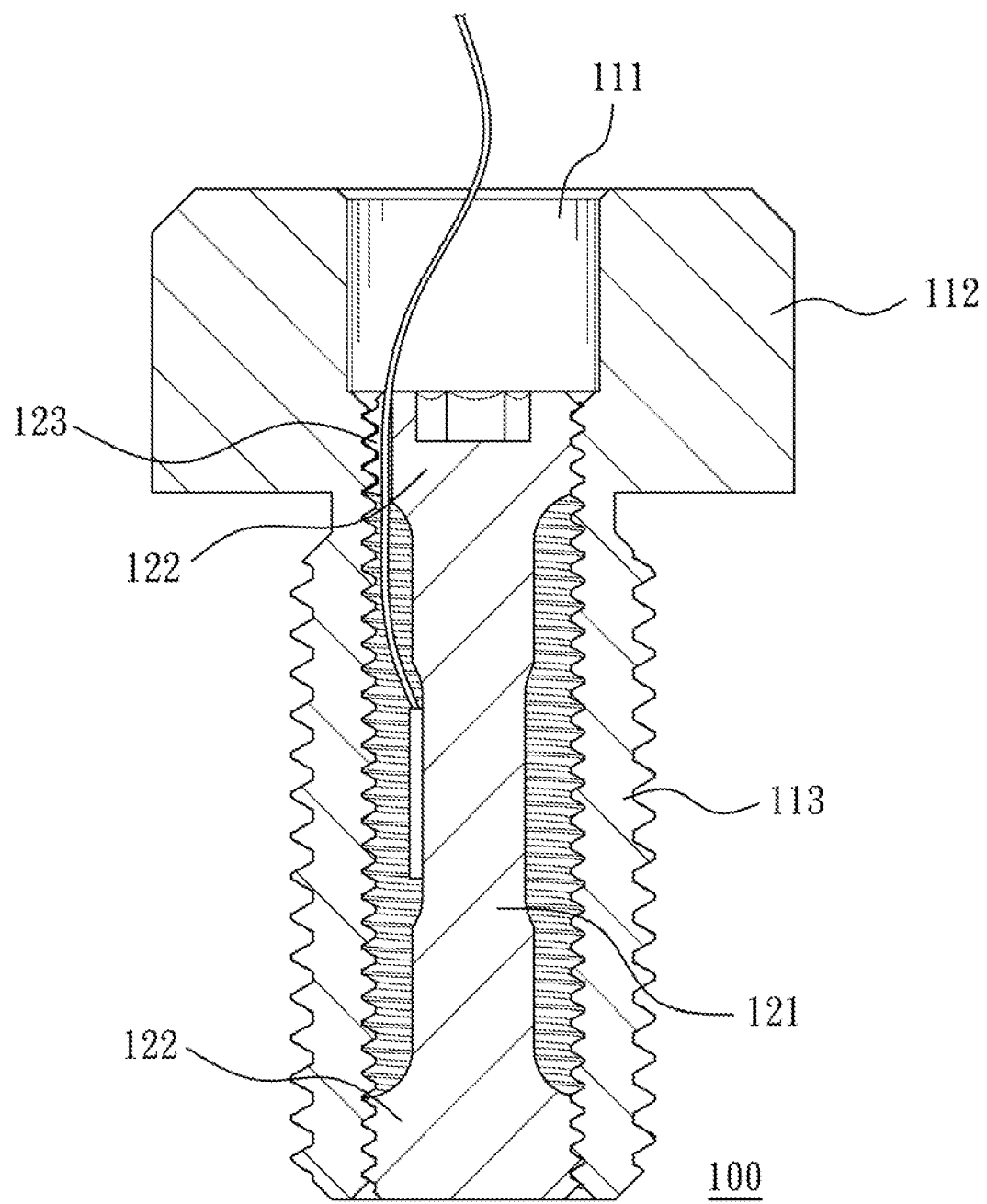
FIG. 2 is a schematic cross-sectional view of FIG. 1.

Referring to FIG. 1 and FIG. 2, FIG. 1 is a structural schematic three-dimensional view of a screw 100 with a stress sensing device according to one embodiment of the present invention, and FIG. 2 is a schematic cross-sectional view of FIG. 1. As shown in FIG. 1, the screw 100 with the stress sensing device includes a screw main body 110, a coaxial member 120 and a stress sensing member 130. The appearance of the screw main body 110 can be a variety of conventional screws such as a hexagonal screw shown in FIG. 1. The stress sensing member 130 can be a variety of strain gauges presented in the market. The screw main body 110 has a hollow threaded hole 111 along its axle center, and the coaxial member 120 is engaged with and screwed in the hollow threaded hole 111, wherein the coaxial member 120 is coaxial with the screw main body 110. The coaxial member 120 includes an elongated body 121 and two threaded parts 122, wherein the two threaded parts 122 which are disposed on both ends of the elongated body 121 are engaged with and screwed in the hollow threaded hole 111 for withstanding a stress applied on the screw main body 110. In other words, when the screw main body 110 is used, the screw main body 110 will withstand stresses such as a torsion, a shear stress, a pulling force from two parts each other, etc., and the two threaded parts 122 will impose the stress on the elongated body 121. At this time, since the stress sensing member 130 is disposed on the elongated body 121, the stress sensing member 130 can indirectly sense the stresses imposed on the screw main body 110.

Figure 3:
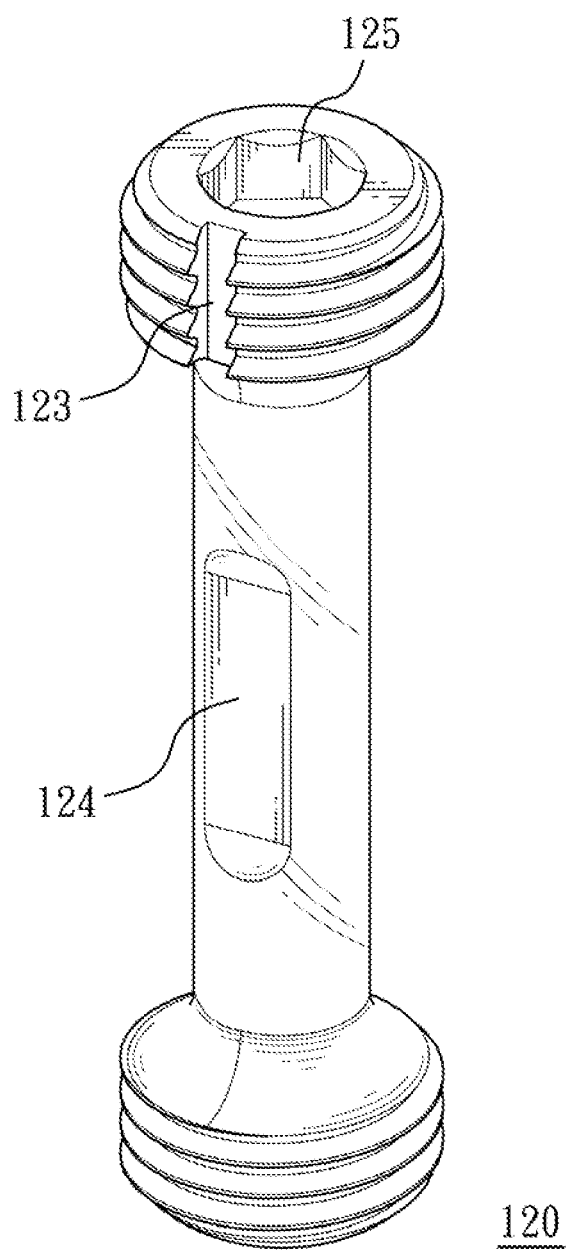
FIG. 3 is a structural schematic three-dimensional view of a coaxial shown in FIG. 1.

Referring to FIG. 3, FIG. 3 is a structural schematic three-dimensional view of a coaxial shown in FIG. 1. As shown in FIG. 3, one of the two threaded parts 120 has a groove 123. The stress sensing member 130 disposed on the elongated body 121 can transmit a stress signal by a wire 131 passing through the groove 123. In addition, in other embodiments, a positioning base 124 can be formed from a concave surface of the elongated body 121 for loading the stress sensing member 130. Furthermore, with an example of FIG. 3, the threaded part 122 with the groove 123 usually is near to a top surface of the screw main body 110; the top surface of the threaded part 122 can be designed to a concave or convex thread angle, such as a hexagonal driving block driven by a female spanner, or a hexagonal driver groove 125 shown in FIG. 3 driven by a hexagonal wrench. It is worth to be noted that, the depth of the hexagonal driver groove 125 is better not to exceed one half of the thickness of the threaded part 122 at which the hexagonal driver groove 125 is located, so as not to affect a physical nature of the stress applied on the screw main body 110 transmitted by the threaded parts 122.

Similarly, in order to make the coaxial member 120 reflect the stress of the screw main body 110 more accurately, it is important to consider that the location of the hollow threaded hole 111 in which the coaxial member 120 should be screwed. With an example of FIG. 2, the screw main body 110 has a screw head 112 and a screw body 113; a inner edge of the threaded part 122 with the groove 123 which is near to the screw head 112 is aligned with a bottom end of the screw head 112, and a outer edge of the threaded part 122 with no groove 123 is aligned with a bottom end of the screw body 113. Accordingly, regardless of the effective location of the screw main body 110, the withstanding stress applied on the screw main body 110 can be transmitted to the elongated body 121 through the two threaded parts 122.

It is worth to be noted that, for example, if fifteen large screws are required to connect two steel plates originally, this embodiment, can design sixteen connection positions and fix the screw 100 with the stress sensing device into one of the sixteen connection positions; or still design fifteen connection positions between two steel plates and just replaces one of the fifteen connection positions with the screw 100 with the stress sensing device. Accordingly, the working conditions of the screw can be sensed or monitored by the stress sensing member 130 under dynamic conditions.

In addition, by comparing the embodiment of the screw 100 with the stress sensing device with Japan Patent No. 6-221315, the screw main body 110 and the coaxial member 120 of the screw 100 with the stress sensing device are coaxial, and thus there is no negative effect of mass eccentricity in the structure. Furthermore, by comparing the embodiment of the screw 100 with the stress sensing device with U.S. Pat. No. 4,823,606, the threaded part 122 with no groove of the coaxial member 120 of the screw 100 with the stress sensing device is located in the screw main body 110. In other words, after a screw of the structure of U.S. Pat. No. 4,823,606 combines two parts, if being applied between the two parts, the horizontal displacement stress cannot be sensed by the screw. In contrast, the stresses applied on each part of the screw main body 110 including a shear stress and a centrifugal force can be faithfully sensed the screw 100 with the stress sensing device of this embodiment.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A screw with a stress sensing device, the screw comprising:
    a screw main body having:
        a screw head disposed at one end of the screw main body;
        a screw body connecting with the screw head; and
        a hollow threaded hole along an axle center of the screw main body;
    a coaxial member engaged with and screwed in the hollow threaded hole, wherein the coaxial member is coaxial with the screw main body, the coaxial member comprising:
        an elongated body; and
        two threaded parts disposed on both ends of the elongated body engaged with and screwed in the hollow threaded hole for withstanding a stress applied on the screw main body, wherein one of the two threaded parts has a groove, each of the two threaded parts has an inner edge disposed at one end thereof, each of the two threaded parts has an outer edge disposed at the other end thereof, both of the inner edges are connected with the elongated body, the inner edge of the threaded part with the groove is aligned with a bottom end of the screw head, and the outer edge of the threaded part with no groove is aligned with a bottom end of the screw body; and
    a stress sensing member disposed on the elongated body, transmitting a stress signal by a wire passing through the groove.

2. The screw of claim 1, further comprising a positioning base formed from a concave surface of the elongated body for loading the stress sensing member.

3. The screw of claim 1, wherein a top surface of the threaded part with the groove is concaved to form a hexagonal driver groove.

4. The screw of claim 3, wherein the depth of the hexagonal driver groove does not exceed one half of the thickness of the threaded part at which the hexagonal driver groove is located.

* * * * *